United States Patent [19]
Harrison

[11] 3,756,360
[45] Sept. 4, 1973

[54] CLUTCH ASSEMBLIES

[75] Inventor: George William Horncy Harrison, Huddersfield, England

[73] Assignee: David Brown Gear Industries Limited, Huddersfield, England

[22] Filed: Mar. 27, 1972

[21] Appl. No.: 238,415

[30] Foreign Application Priority Data
Apr. 23, 1971 Great Britain.................. 11,196/71

[52] U.S. Cl.............. 192/48.3, 192/48.92, 192/72, 192/85 A, 192/86
[51] Int. Cl............................................ F16d 47/04
[58] Field of Search...................... 192/48.3, 48.92, 192/72, 86, 85 A

[56] References Cited
UNITED STATES PATENTS

| | | | |
|---|---|---|---|
| 3,251,442 | 5/1966 | Aschauer.................... | 192/48.92 X |
| 1,984,337 | 12/1934 | Fast...................... | 192/72 |
| 1,957,500 | 5/1934 | Harris et al........................ | 192/48.3 |
| 2,926,765 | 3/1960 | Heid............................ | 192/48.92 X |
| 3,072,234 | 1/1963 | Maurice et al.............. | 192/48.92 X |

Primary Examiner—Allan D. Herrmann
Attorney—Norris & Bateman

[57] ABSTRACT

A clutch assembly for connection between a prime mover and a power transmission mechanism comprises a sprag clutch with a cone clutch co-axially surrounding it on its input side. The co-axial arrangement avoids out-of-balance forces which would cause vibration. The cone clutch is normally engaged by reason of a hydraulically-induced interference fit between its co-acting surfaces, but if it is temporarily necessary to run the prime mover without transmitting any torque through the clutch assembly the cone clutch can be coupled by removable hoses to a supply of hydraulic fluid under pressure which disengages said clutch and is subsequently used to re-engage it.

6 Claims, 1 Drawing Figure

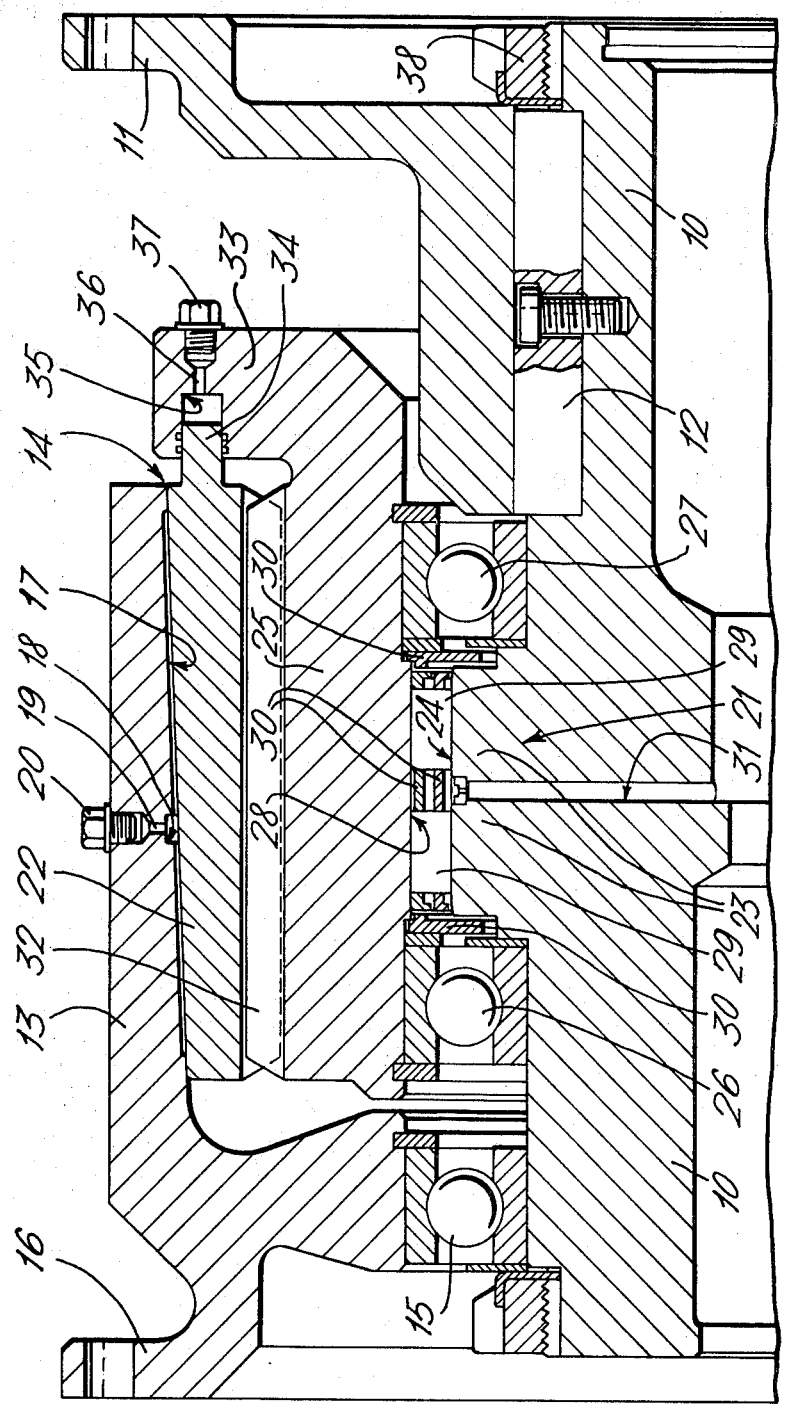

3,756,360

CLUTCH ASSEMBLIES

BACKGROUND OF INVENTION

The invention relates to a clutch assembly, for connection between a prime mover and a power transmission mechanism, of the type including a one-way clutch, that is to say a clutch capable of transmitting torque in one direction only, and another clutch arranged in series with the one-way clutch and operable to isolate the power transmission mechanism from the prime mover.

Known clutch assemblies of this type, and more particularly those transmitting large torques at high speeds, often suffer from the disadvantage that vibrations are set up due to out-of-balance features of said other clutch.

The object of the present invention is to provide a clutch assembly of the above type in which vibrations are reduced or obviated.

SUMMARY OF INVENTION

According to the invention, in a clutch assembly of the type referred to one of the clutches co-axially surrounds the other.

BRIEF DESCRIPTION OF DRAWINGS

A preferred embodiment of the invention will now be described, by way of example only, with reference to the accompanying drawing which is a sectional side elevation, on one side only of its axis, of a clutch assembly symmetrical about said axis.

DESCRIPTION OF PREFERRED EMBODIMENT

Referring now to the drawing, a sleeve 10 is adapted to be connected to a power transmission mechanism by an output flange 11 rigidly secured to one end of said sleeve by a locknut 38 and a key 12. An input portion 13 of a cone clutch indicated generally at 14 is rotatably mounted on a bearing 15 disposed at the other end of the sleeve 10 and surrounds the latter for about two-thirds of its length. The input portion 13 is adapted to be connected to a prime mover by a flange 16 formed at that end of said portion remote from the output flange 11. The input portion 13 has a tapered bore the diameter of which decreases from its open end adjacent the output flange 11. The tapered bore is provided with a plurality of, for example six, axial grooves 17 of constant cross-section which are equally spaced apart angularly and extend over the greater part of the length of the bore but not to the ends thereof. The grooves 17 communicate via an annular groove 18 with three radial holes 19 which are equally spaced apart angularly in the input portion 13 of the cone clutch 14 and are normally blanked off by respective screwed plugs 20. Between the bore of said input portion and the periphery of the sleeve 10, and co-axially thereof, a sprag clutch indicated generally at 21 and an output portion 22 of the cone clutch 14 are housed. The sprag clutch 21 has an inner race integral with the sleeve 10 and comprising a portion 23 of slightly increased diameter which has a hardened periphery 24. The sprag clutch 21 has a driving member 25 carried by two bearings 26 and 27 disposed one on either side of the inner race thereof. That part 28 of the bore of the driving member 25 of the sprag clutch 21 disposed between said two bearings is hardened and forms the outer race of said clutch. Sprags 29 are housed in a cage 30 interposed between the two races of the sprag clutch 21 and co-act with the hardened surfaces 24 and 28 in known manner to form a one-way clutch. Three radial holes 31 which are equally spaced apart angularly are formed in the sleeve 10 to carry lubricant to the sprag clutch 21. The periphery of the driving member 25 of the sprag clutch 21 is provided with splines 32, and said member has a flange 33 located between the output flange 11 of the sleeve 10 and the open end of the input portion 13 of the cone clutch 14. The output portion 22 of the cone clutch 14 is a cylindrical member having a splined bore engagable slidably on the splines 32 formed on the periphery of the driving member 25 of the sprag clutch 21, and a tapered periphery which fits the tapered bore in the input portion 13 of the cone clutch 14. An annular piston 34 projects axially from the large diameter end of the output portion 22 of the cone clutch 14 and fits slidably in an annular cylinder 35 formed in the flange 33 on the driving member 25 of the sprag clutch 21. The annular cylinder 35 communicates with three axial holes 36 which are equally spaced apart angularly in the flange 33 and are normally blanked off by respective screwed plugs 37.

In operation, torque is normally transmitted from the prime mover via the cone clutch 14 and the sprag clutch 21 to the sleeve 10, and said sleeve can overrun the prime mover due to the unidirectional driving capability of the sprag clutch 21. If it is desired to run the prime mover without transmitting any torque to the sleeve 10, the most accessible one of the plugs 20 and the most accessible one of the plugs 37 are removed and replaced by respective hoses connected via control valve means to a common supply of hydraulic fluid under pressure. The cone clutch 14 can then be temporarily disengaged by supplying hydraulic fluid under pressure solely to the grooves 17 in the bore of the input portion 13 to compress the output portion 22 radially and to cause said portion to move axially out of engagement with the input portion 13. The cone clutch 14 is subsequently re-engaged by supplying hydraulic fluid under pressure first to the annular cylinder 35 and then to both said cylinder and the grooves 17 in the bore of the input portion 13. The pressure in the grooves 17 acts to compress the output portion 22 to enable an interference fit to be established between it and the input portion 13. The magnitude of the pressure can be regulated so that a predetermined degree of interference will be obtained. The supply of hydraulic fluid to the grooves 17 is then cut off, and subsequently the supply of hydraulic fluid to the annular cylinder 35 is cut off. The hoses are then removed and replaced by the two plugs 20 and 37, after which the transmission of torque can be resumed. As all the components of the clutch assembly are co-axially mounted cylindrical members, out-of-balance forces and consequent vibrations are accordingly eliminated.

In a modification, the sleeve 10 surrounds the sprag clutch 21 which in turn surrounds the cone clutch 14.

I claim:

1. A clutch assembly including a one-way clutch and a cone clutch in series with one another, one of the clutches co-axially surrounding the other, each clutch having a driving portion and a driven portion and one portion of the cone clutch being slidable axially of, and drivably engaging, one portion of the one-way clutch, and fluid-operated means for engaging the cone clutch comprising an annular piston formed at one end of said one portion of the cone clutch and an annular cylinder in which the piston is slidable formed in said one portion of the one-way clutch.

2. A clutch assembly according to claim 1, wherein the fluid-operated means are hydraulically operated.

3. A clutch assembly according to claim 1, wherein the driven portion of the cone clutch is radially compressible, to enable an interference fit to be established or disestablished between it and the driving portion of said clutch, by hydraulic means.

4. A clutch assembly according to claim 3, wherein the hydraulic means comprise axial grooves in the driving portion of the cone clutch.

5. A clutch assembly according to claim 1, wherein the driven portion of the cone clutch surrounds the driving portion of the one-way clutch.

6. A clutch assembly according to claim 5, wherein the driven portion of the cone clutch has internal splines which engage with external splines on the periphery of the driving portion of the one-way clutch.

* * * * *